United States Patent
Maranville et al.

(10) Patent No.: US 10,279,650 B2
(45) Date of Patent: May 7, 2019

(54) ADAPTIVE VEHICLE CLIMATE CONTROL SYSTEM AND METHOD

(71) Applicant: FORD GLOBAL TECHNOLOGIES, LLC, Dearborn, MI (US)

(72) Inventors: Clay Wesley Maranville, Ypsilanti, MI (US); Kenneth J. Jackson, Dearborn, MI (US); James George Gebbie, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 920 days.

(21) Appl. No.: 14/606,080

(22) Filed: Jan. 27, 2015

(65) Prior Publication Data

US 2016/0214456 A1 Jul. 28, 2016

(51) Int. Cl.
| | |
|---|---|
| *B60H 1/00* | (2006.01) |
| *F25B 27/00* | (2006.01) |
| *B60H 1/32* | (2006.01) |
| *B60H 1/24* | (2006.01) |
| *B60H 3/00* | (2006.01) |

(Continued)

(52) U.S. Cl.
CPC ..... *B60H 1/00392* (2013.01); *B60H 1/00964* (2013.01); *B60H 1/00971* (2013.01); *B60H 1/00* (2013.01); *B60H 1/00271* (2013.01); *B60H 1/00285* (2013.01); *B60H 1/00292* (2013.01); *B60H 1/00414* (2013.01); *B60H 1/00921* (2013.01); *B60H 1/02* (2013.01); *B60H 1/24* (2013.01); *B60H 1/243* (2013.01); *B60H 1/248* (2013.01); *B60H 1/32* (2013.01); *B60H 3/00* (2013.01); *B60H 3/02* (2013.01); *B60L 1/02* (2013.01); *B60N 2/56* (2013.01);

(Continued)

(58) Field of Classification Search
CPC ........ B60H 1/00285; B60H 3/00; B60H 1/00; B60H 1/00414; B60H 1/00392; B60H 1/00292; B60H 1/00742; B60H 1/00785; B60H 1/00835; B60H 1/00849; B60H 1/00764; B60H 1/00878; B60H 3/02; B60H 1/2215; B60H 1/00964; B60H 1/00971; B60H 1/2218; B60N 2/56; B60N 2/5628; B60N 2/002; B64D 13/00; F24F 3/14; F24F 3/12; F24F 3/1411; F24F 3/1423; G06F 7/00; B60K 37/06
See application file for complete search history.

(56) References Cited

U.S. PATENT DOCUMENTS 5,832,990 A 11/1998 Eisenhour
5,873,256 A * 2/1999 Denniston .......... B60H 1/00414
62/244

(Continued)

FOREIGN PATENT DOCUMENTS

DE 102008061773 A1 6/2010

*Primary Examiner* — Behrang Badii
(74) *Attorney, Agent, or Firm* — Carlson, Gaskey & Olds (57) ABSTRACT

Vehicle climate control systems include heating, ventilating and air conditioning (HVAC) systems for adjusting the vehicle cabin temperature. The HVAC system can deliver heated or cooled air to the vehicle interior to achieve a desired temperature inside the vehicle cabin. Some vehicles are equipped with secondary comfort features, such as heated or cooled seats, for additionally addressing occupant comfort. These features are typically stand-alone devices that function separately from the HVAC system.

13 Claims, 3 Drawing Sheets

(51) Int. Cl.
*B60N 2/56* (2006.01)
*B60H 1/02* (2006.01)
*H05B 3/02* (2006.01)
*B60L 1/02* (2006.01)
*B60H 3/02* (2006.01)

(52) U.S. Cl.
CPC ............ *B60N 2/5685* (2013.01); *F25B 27/00* (2013.01); *H05B 3/02* (2013.01)

(56) References Cited

U.S. PATENT DOCUMENTS

| | | | |
|---|---|---|---|
| 6,186,886 B1* | 2/2001 | Farrington | B60H 1/243 454/124 |
| 6,454,178 B1 | 9/2002 | Fusco et al. | |
| 7,275,379 B2 | 10/2007 | Zeng et al. | |
| 8,346,422 B2 | 1/2013 | Chen | |
| 2009/0032518 A1* | 2/2009 | Ohashi | B60N 2/5685 219/202 |
| 2010/0176110 A1* | 7/2010 | Ogino | B60H 1/00271 219/202 |
| 2011/0005255 A1* | 1/2011 | Tanihata | B60H 1/00785 62/238.7 |
| 2012/0234930 A1 | 9/2012 | Wijaya | |
| 2012/0312520 A1* | 12/2012 | Hoke | B60H 1/00285 165/203 |
| 2013/0232996 A1 | 9/2013 | Goenka et al. | |
| 2013/0274968 A1 | 10/2013 | Federico et al. | |

\* cited by examiner

ADAPTIVE VEHICLE CLIMATE CONTROL SYSTEM AND METHOD

TECHNICAL FIELD

This disclosure relates to an adaptive vehicle climate control system and method. An occupant comfort level inside the vehicle can be automatically modified during AUTO mode or ECO mode by adjusting a temperature inside the vehicle and actuating at least one auxiliary comfort feature of the vehicle.

BACKGROUND

Vehicle climate control systems include heating, ventilating and air conditioning (HVAC) systems for adjusting the vehicle cabin temperature. The HVAC system can deliver heated or cooled air to the vehicle interior to achieve a desired temperature inside the vehicle cabin. Some vehicles are equipped with secondary comfort features, such as heated or cooled seats, for additionally addressing occupant comfort. These features are typically stand-alone devices that function separately from the HVAC system.

Electrified vehicles present unique climate control challenges. For example, achieving desired comfort levels inside the vehicle cabin of an electrified vehicle must be balanced against maximizing the driving range of the electrified vehicle.

SUMMARY

A method according to an exemplary aspect of the present disclosure includes, among other things, automatically adjusting an occupant comfort level inside a vehicle during AUTO mode or ECO mode of a climate control system of the vehicle. The step of automatically adjusting includes modifying a temperature inside the vehicle and actuating a first auxiliary comfort feature and a second auxiliary comfort feature of the vehicle, the first auxiliary comfort feature being a different feature from the second auxiliary comfort feature.

In a further non-limiting embodiment of the foregoing method, the first auxiliary comfort feature is a heated or cooled seat and the second auxiliary comfort feature is heated glass.

In a further non-limiting embodiment of either of the foregoing methods, the first auxiliary comfort feature is a heated steering wheel and the second auxiliary comfort feature is heated glass.

In a further non-limiting embodiment of any of the foregoing methods, the first auxiliary comfort feature is a heated or cooled seat and the second auxiliary comfort feature is a heated steering wheel.

In a further non-limiting embodiment of any of the foregoing methods, the method includes actuating a third auxiliary comfort feature to modify the temperature inside the vehicle. The first auxiliary comfort feature is a heated or cooled seat, the second auxiliary comfort feature is a heated steering wheel, and the third auxiliary comfort feature is heated glass.

In a further non-limiting embodiment of any of the foregoing methods, the step of modifying the temperature inside the vehicle includes offsetting the temperature by a predefined temperature offset value.

In a further non-limiting embodiment of any of the foregoing methods, the offsetting step includes deriving the predefined temperature offset value from the heating strategy of Table 1.

In a further non-limiting embodiment of any of the foregoing methods, the offsetting step includes deriving the predefined temperature offset value from the cooling strategy of Table 4.

In a further non-limiting embodiment of any of the foregoing methods, the method includes offsetting the temperature inside the vehicle by a predefined temperature offset value in response to a manual override of at least one of the first auxiliary comfort feature and the second auxiliary comfort feature.

In a further non-limiting embodiment of any of the foregoing methods, the method includes offsetting the temperature by a first predefined temperature offset value if the ECO mode is ON and offsetting the temperature by a second predefined temperature offset value if the ECO mode is OFF.

A method according to another exemplary aspect of the present disclosure includes, among other things, offsetting a temperature inside a passenger cabin of a vehicle by a predefined temperature offset value if a passenger of the vehicle has manually activated at least one auxiliary comfort feature of the vehicle.

In a further non-limiting embodiment of the foregoing method, the method includes offsetting the temperature by a first predefined temperature offset value if ECO mode is ON and offsetting the temperature by a second predefined temperature offset value if ECO mode is OFF.

In a further non-limiting embodiment of either of the foregoing methods, the offsetting step includes deriving the predefined temperature offset value from the heating strategy of Table 1.

In a further non-limiting embodiment of any of the foregoing methods, the predefined temperature offset value is further derived using Table 2 and Table 3.

In a further non-limiting embodiment of any of the foregoing methods, the offsetting step includes deriving the predefined temperature offset value from the cooling strategy of Table 4.

In a further non-limiting embodiment of any of the foregoing methods, the predefined temperature offset value is further derived using Table 5 and Table 6.

In a further non-limiting embodiment of any of the foregoing methods, the at least one auxiliary comfort feature includes a heated or cooled seat, a heated steering wheel or heated glass.

A vehicle system according to another exemplary aspect of the present disclosure includes, among other things, a HVAC system, a first auxiliary comfort feature, a second auxiliary comfort feature different from the first auxiliary comfort feature and a zonal climate control unit configured to command a temperature change inside a vehicle using the HVAC system and configured to actuate the first auxiliary comfort feature and the second auxiliary comfort feature to modify an occupant comfort level inside the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes an adaptive vehicle climate control system and method. The adaptive vehicle climate control system can be employed to automatically adjust an occupant comfort level inside a vehicle during AUTO mode or ECO mode. The occupant comfort level can be modified by adjusting a temperature inside the vehicle and actuating one or more auxiliary comfort features. In some embodiments, at least two different auxiliary comfort features are actuated to adjust the occupant comfort level inside the vehicle. In other embodiments, the occupant comfort level is modified by a predefined temperature offset value, which is based on tabular settings, in response to a manual override of at least one auxiliary comfort feature. These and other features are discussed in greater detail in the following paragraphs of this disclosure.

Figure 1:
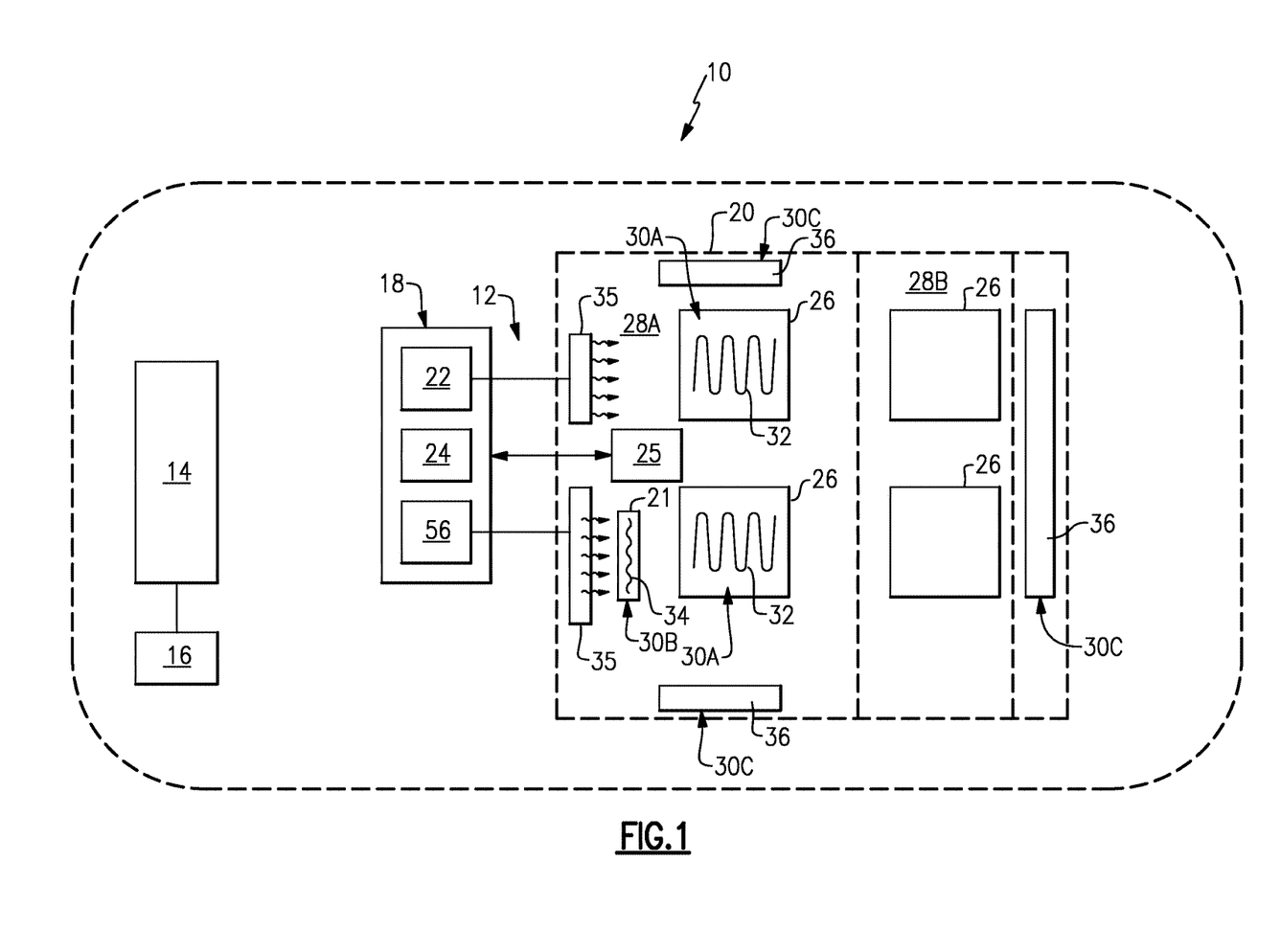
FIG. 1 schematically illustrates a vehicle equipped with a climate control system.

FIG. 1 illustrates a vehicle 10 equipped with a climate control system 12. The vehicle 10 may be a conventional motor vehicle or an electrified vehicle, such as a hybrid electric vehicle (HEV), a plug-in hybrid electric vehicle (PHEV), or a battery electric vehicle (BEV). The concepts described in this disclosure are not limited to any particular vehicle type.

The vehicle 10 may include a power source 14 for propelling the vehicle 10. In one embodiment, the power source 14 is an internal combustion engine. In another embodiment, the power source 14 is an electric machine. In yet another embodiment, the power source 14 includes both an engine and an electric machine, such as in a hybrid arrangement. Electrified vehicle embodiments may additionally include a high voltage battery assembly 16 for powering the power source 14.

The vehicle 10 includes a passenger cabin 20 where passengers reside during vehicle operation. The passenger cabin 20 may house one or more seats 26. The total number of seats 26 provided within the passenger cabin 20 is not intended to limit this disclosure. The passenger cabin 20 may additionally include various other components, including but not limited to, a steering wheel 21 and brake and accelerator pedals (not shown). In another embodiment, an interface display 25 is located inside the passenger cabin 20. The interface display 25 includes various knobs, buttons, actuators, touch screens, etc. for providing vehicle passengers with the ability to select a desired comfort level inside the passenger cabin 20. In other words, the interface display 25 enables vehicle passengers to control the climate control system 12. The interface display 25 may also provide a visual output to the passengers.

The climate control system 12 includes a heating, ventilation and air conditioning (HVAC) system 18 for adjusting a temperature inside the passenger cabin 20. The passenger cabin 20 may be divided into a plurality of zones 28. Each of the zones 28 encompasses an area of the passenger cabin 20 that may be thermally managed by the HVAC system 18. In one non-limiting embodiment, the passenger cabin 20 is divided into a first zone 28A that encompasses the front of the passenger cabin 20 and a second zone 28B that encompasses the rear of the passenger cabin 20. However, the passenger cabin 20 could be divided into any number of zones. For example, in another embodiment, each seat 26 could occupy its own zone 28.

The HVAC system 18 is equipped to raise or lower the temperature inside the passenger cabin 20. The HVAC system 18 may include a heating element 22 for communicating heated air into the passenger cabin 20 (i.e., to heat the passenger cabin 20) and a cooling element 24 for communicating cooled air to the passenger cabin 20 (i.e., to cool the passenger cabin 20). In one non-limiting embodiment, the heating element 22 is a heater core and the cooling element 24 is an evaporator core. A blower 56 of the HVAC system 18 may be controlled to cause airflow to flow through the HVAC system 18 and into the passenger cabin 20. Other heating and cooling devices may also be utilized to heat and/or cool the passenger cabin 20 within the scope of this disclosure.

Although not shown in the highly schematic depiction of FIG. 1, the HVAC system 18 may also include an arrangement of ducts, conduits, doors, and/or actuators that are employable to direct a flow of air through either the heating element 22 or the cooling element 24 to adjust a temperature of the airflow. In another embodiment, the ducts, doors, conduits and/or actuators may be employed to control a mixture of ambient air with air recirculated from the passenger cabin 20. The ducts may be in fluid communication with a plurality of vents 35 which direct the heated or cooled air into the passenger cabin 20. The vents 35 may include any size or shape and may be positioned at any location of the passenger cabin 20.

The climate control system 12 may additionally include one or more auxiliary comfort features 30. In one embodiment, a first auxiliary comfort feature 30A includes heated and/or cooled seats. For example, one or more of the seats 26 may include heating/cooling elements 32 for warming or cooling the seat 26. In one non-limiting embodiment, the heating/cooling elements 32 include electrical resistive wiring disposed within the seat 26.

A second auxiliary comfort feature 30B that may be provided is a heated steering wheel 21. For example, the steering wheel 21 may include a heating element 34 for warming the steering wheel. The first auxiliary comfort feature 30A may be provided alone or in combination with the second auxiliary comfort feature 30B.

In yet another embodiment, the climate control system 12 may include a third auxiliary comfort feature 30C. In this embodiment, the third auxiliary comfort feature 30C includes heated glass 36. The heated glass 36 may be actuated to heat a windshield (front or rear) or side window of the vehicle 10 to defrost, defog, or otherwise remove moisture from the glass. In one embodiment, the heated glass 36 warms the glass via an electric current until the glass radiates heat. The third auxiliary comfort feature 30C may be provided alone or in combination with one or more of the first and second auxiliary comfort features 30A and 30B.

Although not shown, other auxiliary comfort features may be provided within the vehicle 10. Non-limiting examples of other auxiliary comfort features include heated glazings, sunshades, heated trim surfaces, and the like.

The climate control system 12, including the HVAC system 18 and the auxiliary comfort features 30, may be utilized to automatically adjust an occupant comfort level inside the passenger cabin 20 of the vehicle 10. These and other features are further discussed below.

Figure 2:
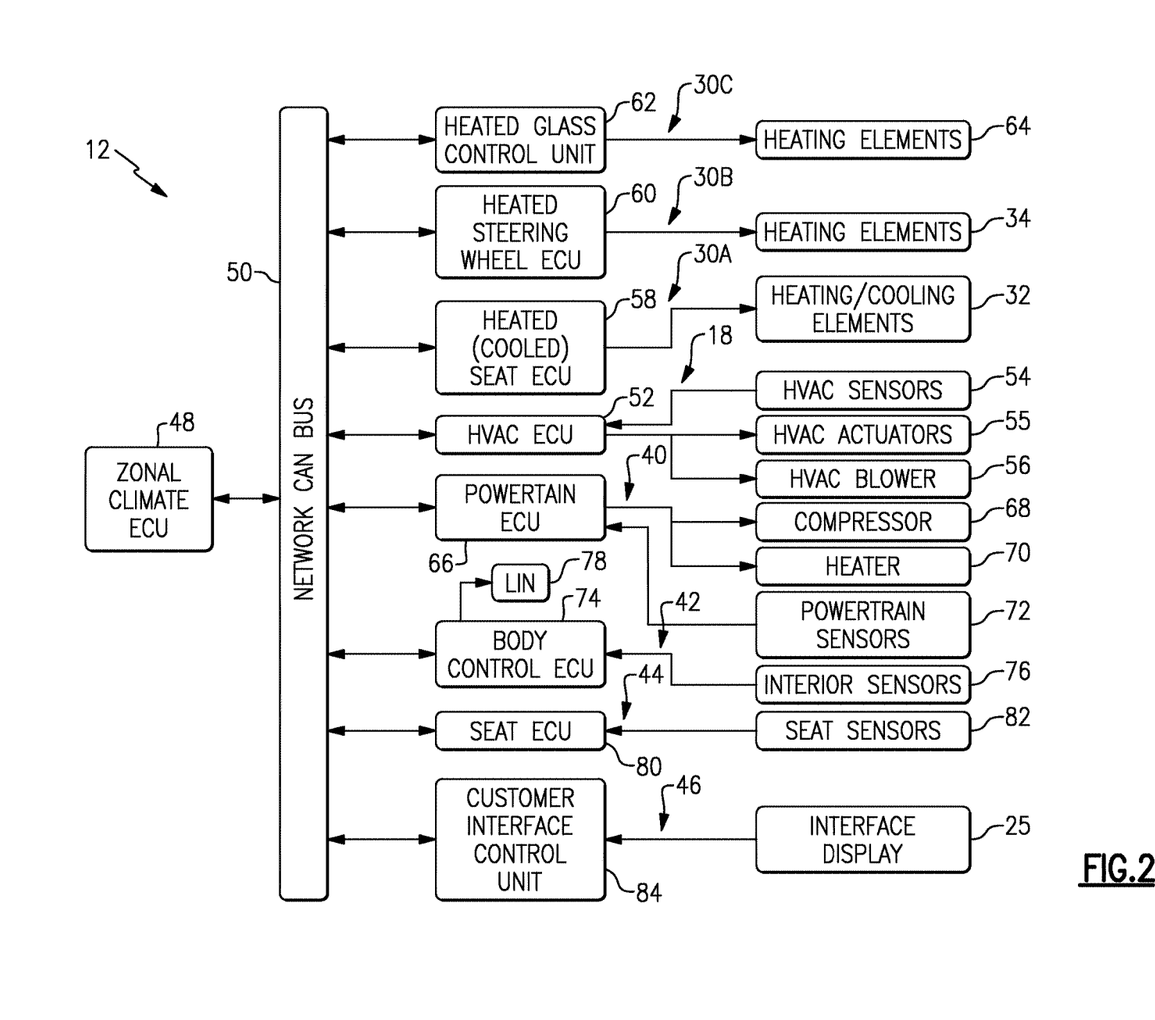
FIG. 2 schematically illustrates an exemplary control topology of an adaptive vehicle climate control system.

FIG. 2 is a more detailed schematic of the climate control system 12 of the vehicle 10. The climate control system 12 may include a zonal climate control unit 48, an HVAC system 18, a first auxiliary comfort feature 30A, a second auxiliary comfort feature 30B, a third auxiliary comfort feature 30C, a powertrain system 40, a body control system 42, a seating system 44 and a passenger interface system 46. Although a specific component relationship is shown in FIG. 2, this disclosure is not limited to the exact configuration shown.

The zonal climate control unit 48 may be part of an overall vehicle control unit, such as a vehicle system controller (VSC), or could alternatively be a stand-alone control unit separate from the VSC. In one embodiment, the zonal climate control unit 48 includes executable instructions for interfacing with and commanding operation of the various components of the climate control system 12. The zonal climate control unit 48 may include various inputs and outputs for interfacing with the other components of the climate control system 12. The zonal climate control unit 48 may also include a processor and non-transitory memory for executing the various control strategies and modes of the climate control system 12. In one embodiment, the zonal climate control unit 48 communicates with the other components of the climate control system 12 over a controller area network (CAN) 50.

The HVAC system 18 may include, among other components, a HVAC control unit 52, HVAC sensors 54, HVAC actuators 55 and a HVAC blower 56. These components can be controlled by the zonal climate control unit 48, based on various inputs, to adjust a temperature inside the vehicle passenger cabin (see feature 20 of FIG. 1). The HVAC control unit 52 is an electronic control unit configured to control operation of the HVAC system 18 based on commands from the zonal climate control unit 48. The HVAC sensors 54 are capable of detecting and measuring parameters and conditions that may influence the passenger cabin temperature. The HVAC sensors 54 may include a variety of sensors, including but not limited to, ambient temperature sensors, sun load sensors, passenger cabin temperature sensors, humidity sensors, etc. The HVAC actuators 55 are employable to vary a direction of airflow through the HVAC system 18. In one embodiment, the HVAC blower 56 is a variable speed blower for causing the airflow to flow into and through the heating and cooling elements 22, 24 (see FIG. 1), through ducts and other conduits of the HVAC system 18, and into the passenger cabin.

The first auxiliary comfort feature 30A, the second auxiliary comfort feature 30B, and the third auxiliary comfort feature 30C may be any of a variety of auxiliary comfort features. In one non-limiting embodiment, the first auxiliary comfort feature 30A is a heated/cooled seat that includes a control unit 58 and a heating/cooling element 32 for warming or cooling the seat. In another embodiment, the second auxiliary comfort feature 30B is a heated steering wheel that includes a control unit 60 and a heating element 34 for warming the steering wheel. In yet another embodiment, the third auxiliary comfort feature 30C is heated glass that includes a control unit 62 and a heating element 64 for defrosting/defogging a window of the vehicle. The climate control system 12 may include any combination of auxiliary comfort features, which can be used in conjunction with the HVAC system 18 to influence the occupant comfort level inside the vehicle. In some embodiments, the zonal climate control unit 48 automatically commands operation of the HVAC system 18 in combination with one or more of the auxiliary comfort features 30A, 30B and 30C to achieve a desired occupant comfort level.

The powertrain system 40 may include a powertrain control unit 66, a compressor 68, a heater 70 and various powertrain sensors 72. The powertrain control unit 66 is an electronic control unit configured to control operation of the powertrain system 40 based on commands from the zonal climate control unit 48. The compressor 68 and the heater 70 may be part of a thermal management system that circulates a refrigerant for exchanging heat with the airflow of the HVAC system 18. The refrigerant may also be used to cool a power source of the vehicle (e.g., the traction motor and/or battery assembly). In one non-limiting embodiment, the heater 70 is a high voltage-positive temperature coefficient heater. The powertrain sensors 72 may include various sensors such as temperature sensors, fluid sensors, pressure sensors, airflow sensors, etc.

The body control system 42 may include a body control unit 74 and a plurality of interior sensors 76. The body control unit 74 is an electronic control unit and is configured to control operation of the body control system 42 based on commands from the zonal climate control unit 48. In one embodiment, the body control unit 74 contains a gateway module between the CAN 50 and a local interconnect network (LIN) 78 and their respective modules. The body control unit 74 could provide the node to connect the powertrain system 40, the body control system 42, and other systems of the climate control system 12, and could be the mechanism of feedback between the various modules of the climate control system 12. The interior sensors 76 may include a variety of sensors, including but not limited to, temperature sensors, cabin humidity sensors, duct discharge temperature sensors, solar luminance/radiation sensors, ambient temperature sensors, seat pressure sensors, infrared skin temperature sensors, air quality sensors, etc.

In one embodiment, the seating system 44 is part of a vehicle restraint system and is configured to provide details concerning the occupancy of the seats 26 (see FIG. 1) of the vehicle. The seating system 44 may include a seating control unit 80 and seat sensors 82. The seating control unit 80 is an electronic control unit that controls operation of the seating system 44 based on commands from the zonal climate control unit 48. The seat sensors 82 may include buckle latch sensors, occupancy sensors, weight sensors, etc.

The customer interface system 46 may include a customer interface control unit 84 and an interface display 25. The customer interface control unit 84 is an electronic control unit that controls operation of the customer interface system 46. The interface display 25 may be located inside the passenger cabin of the vehicle for accepting inputs from the vehicle passengers. The interface display 25 includes various knobs, buttons, switches, actuators, touch screens, etc. for providing vehicle passengers with the ability to select a desired comfort level inside the passenger cabin 20. The interface display 25 may also provide a visual output to the passengers. In one non-limiting embodiment, the interface display 25 includes devices (i.e., buttons, toggles, etc.) for selecting operation of the auxiliary comfort features 30A, 30B, 30C, or for selecting various climate control settings, including but not limited to, temperature, mode (AUTO/ECO/MANUAL, etc.) fan speed (low, medium, high, off), etc.

The zonal climate control unit 48 is configured to receive various requests and input signals from the other systems of the climate control system 12, analyze these requests and signals, and command a desired occupant comfort level within the passenger cabin of the vehicle based on this analysis. For example, the zonal climate control unit 48 may communicate with each of the HVAC control unit 52, the heated/cooled seat control unit 58, the heated steering wheel control unit 60, the heated glass control unit 62, the powertrain control unit 66, the body control unit 74, the seating control unit 80 and the customer interface control unit 84 over the CAN 50. Based on the information received from the various sensors of the climate control system 12, the zonal climate control unit 48 can instruct one or more of these other control units to command operation of various devices and actuators to modify the occupant comfort level to a desired temperature setpoint. This procedure can be performed automatically if the passenger has selected an AUTO or ECO mode setting at the interface display 25.

By way of one non-limiting example, assume a passenger has selected AUTO mode and a temperature of 72° F. using the interface display 25. In response to these settings, the zonal climate control unit 48 may modify the occupant comfort level inside the vehicle by automatically adjusting a temperature inside the vehicle using the HVAC system 18. The zonal climate control unit 48 can further actuate one or more of the auxiliary comfort features 30A, 30B and 30C to achieve the desired occupant comfort level. Actuating the auxiliary comfort features 30A, 30B and 30C in this manner contributes to a portion of the occupant comfort level, which may reduce the amount of heated or cooled airflow that must be generated by the HVAC system 18 to meet the climate demand.

Figure 3:
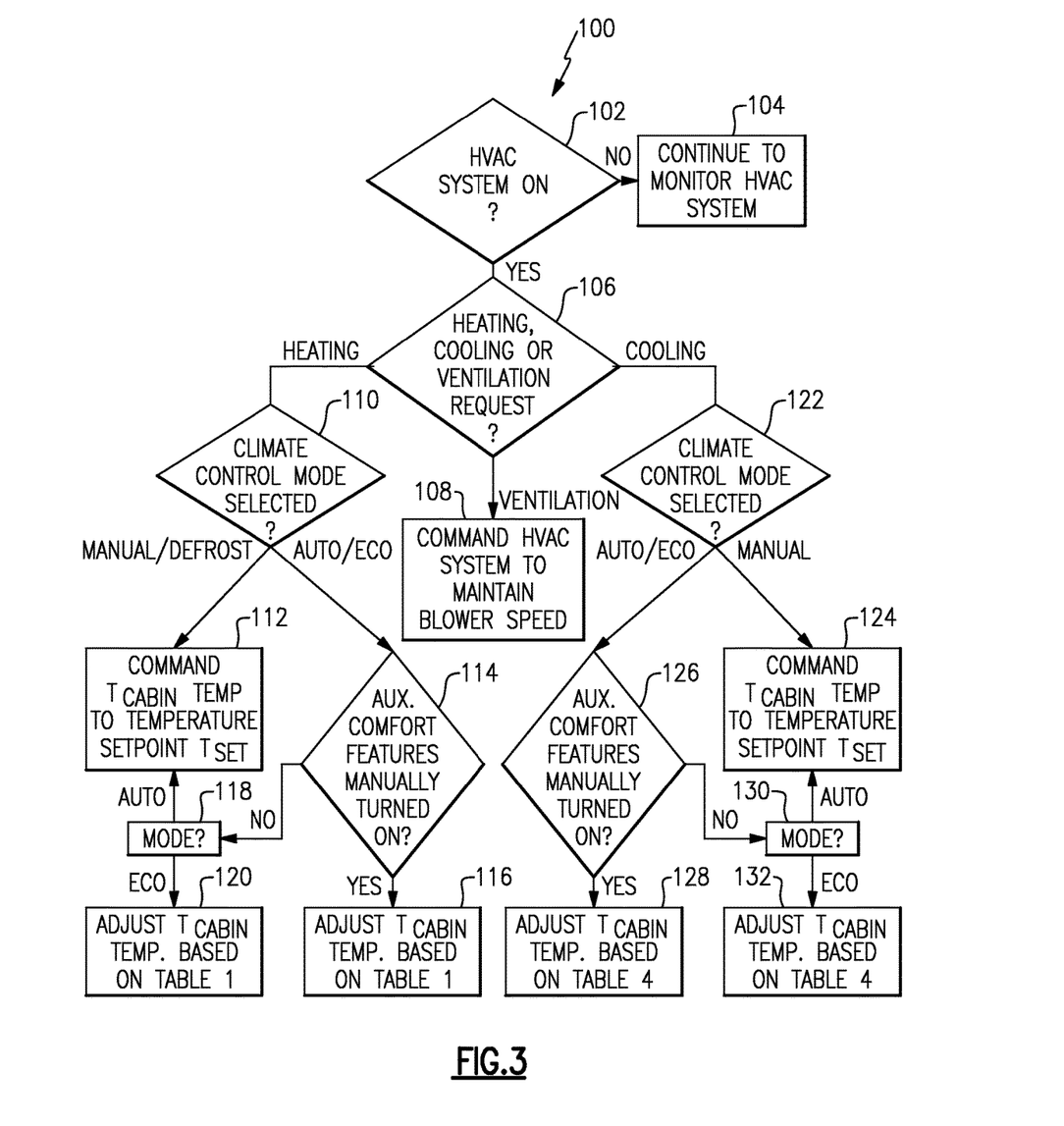
FIG. 3 schematically illustrates an exemplary control strategy for adjusting an occupant comfort level inside a vehicle.

FIG. 3, with continued reference to FIGS. 1 and 2, schematically illustrates a control strategy 100 for controlling operation of the climate control system 12 of the vehicle 10. In one embodiment, the control strategy 100 may be executed to automatically adjust an occupant comfort level inside the passenger cabin 20 of the vehicle 10. The zonal climate control unit 48 of the climate control system 12 may be programmed with one or more algorithms adapted to execute the control strategy 100, or any other control strategy. In one non-limiting embodiment, the control strategy 100 is stored as executable instructions in the memory of the zonal climate control unit 48. The executable instructions may be embodied within any computer readable medium and may be executed by a processor (e.g., a micro-computer) of the zonal climate control unit 48.

As shown in FIG. 3, the control strategy 100 begins at block 102 by determining whether the HVAC system 18 has been turned ON. If the HVAC system 18 is not ON, the zonal climate control unit 48 may continue to monitor the HVAC system 18 at block 104 to determine whether it has been turned ON. In one embodiment, the zonal climate control unit 48 may monitor the status of the HVAC system 18 by communicating with at least the HVAC control unit 52 and the customer interface control unit 84. Once it has been determined that the HVAC system 18 is ON, the control strategy 100 next determines whether a heating request, cooling request or ventilation request has been made by a passenger of the vehicle 10 at block 106. The heating, cooling and ventilation requests may be selected by the passenger at the interface display 25.

If a ventilation request is confirmed at block 106, the zonal climate control unit 48 may command the HVAC system 18 to maintain a speed of the HVAC blower 56 at block 108. Maintaining the speed of the blower 56 in this manner achieves any necessary ventilation demands. The speed of the blower 56 may also be selected by the passenger using the interface display.

Alternatively, if a heating request is confirmed at block 106, the control strategy proceeds to block 110. The control strategy 100 determines which climate control mode (MANUAL/DEFROST/AUTO/ECO) has been selected at block 110. The selection of the climate control mode may occur at the interface display 25. If MANUAL or DEFROST modes are confirmed at block 110, the zonal climate control unit 48 commands the HVAC system 18 to generate a passenger cabin 20 temperature $T_{cabin}$ equal to the requested temperature setpoint $T_{set}$ at block 112. The temperature setpoint $T_{set}$ may also be selected using the interface display 25.

If either AUTO or ECO modes are confirmed at block 110, the control strategy 100 proceeds to block 114 by determining whether any auxiliary comfort features 30A, 30B, 30C have been manually turned ON. This situation is considered a "manual override" by the zonal climate control unit 48 because the passenger has manually selected the auxiliary comfort feature(s) 30A, 30B and/or 30C as opposed to the feature(s) being automatically actuated ON or OFF by the zonal climate control unit 48. If one or more of the auxiliary comfort features 30A, 30B and/or 30C have been manually turned ON, the control strategy 100 proceeds to block 116 by adjusting the temperature $T_{cabin}$ of the passenger cabin 20 according to tabular settings which are stored in the memory of the zonal climate control unit 48, such as in a look-up table. For example, the temperature $T_{cabin}$ may be offset by a predefined temperature offset value established by heat strategy of Table 1:

TABLE 1

Heating Strategy

| Auxiliary Comfort Features | ECO Mode | Blower Mode Setting | Temperature Control Setpoint |
|---|---|---|---|
| ON | ON | AUTO | TCabin = TSET − OFFSET_1H<br>OFFSET_1H = (fn. Tamb, Heating Feature Settings, DriveMode) |
| OFF | ON | AUTO | TCabin = TSET − OFFSET_2H<br>OFFSET_2H = (fn. Tamb, DriveMode) |
| ON | OFF | AUTO | TCabin = TSET − OFFSET_3H<br>OFFSET_3H = (fn. Tamb, Heating Feature Settings) |
| OFF | OFF | AUTO | TCabin = TSET − OFFSET_4H<br>OFFSET_4H = (fn. Tamb) |
| ON | ON | MANUAL | TCabin = TSET |
| OFF | ON | MANUAL | TCabin = TSET |
| ON | OFF | MANUAL | TCabin = TSET |
| OFF | OFF | MANUAL | TCabin = TSET |
| ON | ON | MAX DEFROST | TCabin = MaxHot |
| OFF | ON | MAX DEFROST | TCabin = MaxHot |
| ON | OFF | MAX DEFROST | TCabin = MaxHot |
| OFF | OFF | MAX DEFROST | TCabin = MaxHot |

In one embodiment, the predefined temperature offset value is a function of one or more of the following variables: ambient temperature ($T_{amb}$), heating feature settings (i.e., broadcast states, from the interface display 25, which indicate what the Customer wants in terms of heating), drive mode, solar (i.e., sunload), etc. These variables may be sensed by various sensors of the climate control system 12 and then communicated to the zonal climate control unit 48 for further analysis. The predefined temperature offset value used in the heating strategy of Table 1 can be derived from additional tabular settings. Table 2 and Table 3 below are non-limiting examples of predefined temperature offsets that may be used to adjust the temperature $T_{cabin}$ of the passenger cabin 20.

TABLE 2

Heating Offset Strategy 1 (heated auxiliary comfort features ON; ECO Mode ON)

| Offset Strategy | Ambient Temp | Solar | Heating Feature Level Request | Temperature Offset |
|---|---|---|---|---|
| OFFSET_1H | Extreme Cold | High | High | −3 |
| OFFSET_1H | Moderate Cold | High | High | −4 |
| OFFSET_1H | Extreme Cold | Mod/Low/None | High | −2 |
| OFFSET_1H | Moderate Cold | Mod/Low/None | High | −3 |
| OFFSET_2H | Extreme Cold | High | Med/Low | −4 |
| OFFSET_2H | Moderate Cold | High | Med/Low | −5 |
| OFFSET_2H | Extreme Cold | Mod/Low/None | Med/Low | −3 |
| OFFSET_2H | Moderate Cold | Mod/Low/None | Med/Low | −2 |

TABLE 3

Heating Offset Strategy 2 (heated auxiliary comfort features ON; ECO Mode OFF)

| Offset Strategy | Ambient Temp | Solar | Heating Feature Level Request | Temperature Offset |
|---|---|---|---|---|
| OFFSET_3H | Extreme Cold | High | High | −2 |
| OFFSET_3H | Moderate Cold | High | High | −3 |
| OFFSET_3H | Extreme Cold | Mod/Low/None | High | −1 |
| OFFSET_3H | Moderate Cold | Mod/Low/None | High | −1 |
| OFFSET_4H | Extreme Cold | High | Med/Low | −3 |
| OFFSET_4H | Moderate Cold | High | Med/Low | −4 |
| OFFSET_4H | Extreme Cold | Mod/Low/None | Med/Low | −2 |
| OFFSET_4H | Moderate Cold | Mod/Low/None | Med/Low | −1 |

Those skilled in the art will readily appreciate that the specific values of temperature and temperature offsets described in the various embodiments of this disclosure are for illustrative purposes only and are not intended to limit this disclosure. As will be appreciated by those of ordinary skill in the art, the actual temperature offset values may be calibrateable. These values are listed as examples only to show the directional change implied by each mode selection. The values do not imply that the thermal physics required to achieve the desired goal of each setting can be understood via first-principles thermodynamics only. A skilled practitioner would be able to evaluate these settings and make appropriate adjustments based on details of the vehicle design.

If none of the auxiliary comfort features 30A, 30B, 30C have been manually turned ON at block 114, the control strategy 100 proceeds to block 118 by determining whether the HVAC system 18 is set in AUTO mode or ECO mode. If set in AUTO mode, the zonal climate control unit 48 commands the HVAC system 18 to generate a temperature $T_{cabin}$ equal to the requested temperature setpoint $T_{set}$ at block 112. Alternatively, if ECO mode is confirmed, the control strategy 100 proceeds to block 120 by adjusting the temperature $T_{cabin}$ according to one of the ECO mode heating strategies proposed by Table 1 (see above).

In yet another embodiment, if a cooling request is confirmed at block 106, the control strategy proceeds to block 122. The control strategy 100 determines which climate control mode (MANUAL/AUTO/ECO) has been selected at block 122. The selection of the climate control mode occurs at the interface display 25. If MANUAL mode is confirmed at block 122, the zonal climate control unit 48 commands the HVAC system 18 to generate a passenger cabin 20 temperature equal to the requested temperature setpoint $T_{set}$ at block 124. However, if either AUTO mode or ECO mode is confirmed at block 122, the control strategy 100 proceeds to block 126 by determining whether any auxiliary comfort features 30A, 30B, 30C have been manually turned ON. If one or more of the auxiliary comfort features 30A, 30B and/or 30C have been manually turned ON, the control strategy 100 proceeds to block 128 by adjusting the temperature $T_{cabin}$ of the passenger cabin 20 according to tabular settings which are stored in the memory of the zonal climate control unit 48, such as in a look-up table. For example, the temperature $T_{cabin}$ may be offset by a predefined temperature offset value established by the cooling strategy of Table 4:

TABLE 4

| Cooling Strategy | | | |
|---|---|---|---|
| Auxiliary Comfort Features | ECO Mode | Blower Mode Setting | Temperature Control Setpoint |
| ON | ON | AUTO | TCabin = TSET + OFFSET_1C OFFSET_1C = (fn. Tamb, Cooling Feature Settings, DriveMode, Solar) |
| OFF | ON | AUTO | TCabin = TSET + OFFSET_2C OFFSET_2C = (fn. Tamb, DriveMode, Solar) |
| ON | OFF | AUTO | TCabin = TSET + OFFSET_3C OFFSET_3C = (fn. Tamb, Heating Feature Settings, Solar) |
| OFF | OFF | AUTO | TCabin = TSET + OFFSET_4C OFFSET_4C = (fn. Tamb, Solar) |
| ON | ON | MANUAL | TCabin = TSET |
| OFF | ON | MANUAL | TCabin = TSET |
| ON | OFF | MANUAL | TCabin = TSET |
| OFF | OFF | MANUAL | TCabin = TSET |
| ON | ON | MAX AC | TCabin = MaxCold |
| OFF | ON | MAX AC | TCabin = MaxCold |
| ON | OFF | MAX AC | TCabin = MaxCold |
| OFF | OFF | MAX AC | TCabin = MaxCold |

In one embodiment, the predefined temperature offset value is a function of one or more of the following variables: ambient temperature ($T_{amb}$), cooling feature settings, drive mode, solar (i.e., sunload), etc. These variables may be sensed by various sensors of the climate control system 12 and then communicated to the zonal climate control unit 48 for further analysis. The predefined temperature offset amount used in the cooling strategy of Table 4 can be derived from additional tabular settings. Table 5 and Table 6 below are non-limiting examples of predefined temperature offsets that may be used to adjust the temperature of the passenger cabin 20.

TABLE 5

Cooling Offset Strategy 1 (cooled auxiliary comfort features ON; ECO Mode ON)

| Offset Strategy | Ambient Temp | Solar | Cooling Feature Level Request | Temperature Offset |
|---|---|---|---|---|
| OFFSET_1C | Extreme Hot | High | High | +0.5 |
| OFFSET_1C | Moderate Hot | High | High | +2 |
| OFFSET_1C | Extreme Hot | Mod/Low/None | High | +2.5 |
| OFFSET_1C | Moderate Hot | Mod/Low/None | High | +4 |
| OFFSET_2C | Extreme Hot | High | Med/Low | +1 |
| OFFSET_2C | Moderate Hot | High | Med/Low | +2.5 |
| OFFSET_2C | Extreme Hot | Mod/Low/None | Med/Low | +3 |
| OFFSET_2C | Moderate Hot | Mod/Low/None | Med/Low | +4.5 |

TABLE 6

Cooling Offset Strategy 2 (cooled auxiliary comfort features ON; ECO Mode OFF)

| Offset Strategy | Ambient Temp | Solar | Cooling Feature Level Request | Temperature Offset |
|---|---|---|---|---|
| OFFSET_3C | Extreme Hot | High | High | +0 |
| OFFSET_3C | Moderate Hot | High | High | +1 |
| OFFSET_3C | Extreme Hot | Mod/Low/None | High | +1.5 |
| OFFSET_3C | Moderate Hot | Mod/Low/None | High | +3 |
| OFFSET_4C | Extreme Hot | High | Med/Low | +.5 |
| OFFSET_4C | Moderate Hot | High | Med/Low | +2 |
| OFFSET_4C | Extreme Hot | Mod/Low/None | Med/Low | +2 |
| OFFSET_4C | Moderate Hot | Mod/Low/None | Med/Low | +3.5 |

If no auxiliary comfort features 30A, 30B, 30C have been manually turned ON at block 126, the control strategy 100 proceeds to block 130 by determining whether the HVAC system 18 is set in AUTO mode or ECO mode. If set in AUTO mode, the zonal climate control unit 48 commands the HVAC system 18 to generate a passenger cabin 20 temperature $T_{cabin}$ equal to the requested temperature setpoint $T_{set}$ at block 124. Alternatively, if ECO mode is confirmed, the control strategy 100 proceeds to block 132 by adjusting the temperature $T_{cabin}$ of the passenger cabin 20 according to one of the ECO mode cooling strategies proposed by Table 4 (see above).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   automatically adjusting an occupant comfort level inside a vehicle during ECO mode of a climate control system of the vehicle, the step of automatically adjusting including modifying a temperature inside the vehicle and actuating at least two of an electrically heated/cooled seat, an electrically heated glass, and an electrically heated steering wheel,
   wherein the step of modifying the temperature inside the vehicle includes offsetting the temperature by a predefined temperature offset value, and;
   the predefined temperature offset value is a function of an ambient temperature, heating feature settings, a drive mode, and a sunload.

2. The method as recited in claim 1, wherein the step of automatically adjusting includes actuating each of the electrically heated/cooled seat, the electrically heated glass, and the electrically heated steering wheel.

3. The method as recited in claim 1, wherein the offsetting step includes deriving the predefined temperature offset value from the heating strategy of Table 1.

4. The method as recited in claim 1, wherein the offsetting step includes deriving the predefined temperature offset value from the cooling strategy of Table 4.

5. The method as recited in claim 1, comprising offsetting the temperature inside the vehicle by a predefined temperature offset value in response to a manual override of at least one of the electrically heated/cooled seat, the electrically heated glass, and the electrically heated steering wheel.

6. The method as recited in claim 5, comprising offsetting the temperature by a first predefined temperature offset value if the ECO mode is ON and offsetting the temperature by a second predefined temperature offset value if the ECO mode is OFF.

7. The method as recited in claim 1, wherein the step of modifying the temperature inside the vehicle includes offsetting the temperature by a predefined temperature offset value according to a heating strategy established by Table 1, Table 2, and Table 3.

8. The method as recited in claim 1, wherein the step of modifying the temperature inside the vehicle includes offsetting the temperature by a predefined temperature offset value according to a cooling strategy established by Table 4, Table 5, and Table 6.

9. The method as recited in claim 6, wherein offsetting the temperature includes deriving the predefined temperature offset value from the heating strategy of Table 1.

10. The method as recited in claim 9, wherein the predefined temperature offset value is further derived using Table 2 and Table 3.

11. The method as recited in claim 6, wherein offsetting the temperature includes deriving the predefined temperature offset value from the cooling strategy of Table 4.

12. The method as recited in claim 11, wherein the predefined temperature offset value is further derived using Table 5 and Table 6.

13. The method as recited in claim 1, wherein activating the at least two of the electrically heated/cooled seat, the electrically heated glass, and the electrically heated steering wheel reduces a demand on the climate control system.

* * * * *

UNITED STATES PATENT AND TRADEMARK OFFICE
CERTIFICATE OF CORRECTION

PATENT NO. : 10,279,650 B2
APPLICATION NO. : 14/606080
DATED : May 7, 2019
INVENTOR(S) : Clay Wesley Maranville, Kenneth J. Jackson and James George Gebbie Page 1 of 1

It is certified that error appears in the above-identified patent and that said Letters Patent is hereby corrected as shown below:

In the Claims

In Claim 9, Column 12, Line 49; replace "The method as recited in claim 6" with --The method as recited in claim 5--

In Claim 11, Column 12, Line 56; replace "The method as recited in claim 6" with --The method as recited in claim 5--

Signed and Sealed this
Twenty-ninth Day of October, 2019

Andrei Iancu
*Director of the United States Patent and Trademark Office*